(12) United States Patent
Nazri

(10) Patent No.: US 6,183,912 B1
(45) Date of Patent: Feb. 6, 2001

(54) HIGH ENERGY GLASS CONTAINING CARBON ELECTRODE FOR LITHIUM BATTERY

(75) Inventor: Gholam-Abbas Nazri, Bloomfield Hills, MI (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/322,517

(22) Filed: May 28, 1999

Related U.S. Application Data

(60) Provisional application No. 60/087,149, filed on May 29, 1998.

(51) Int. Cl.[7] .................................................. H01M 4/02
(52) U.S. Cl. .................. 429/231.8; 429/231.95; 429/218.1; 423/414
(58) Field of Search ............................ 429/231.95, 218.1, 429/231.8; 423/414

(56) References Cited

U.S. PATENT DOCUMENTS 5,851,504 * 12/1998 Barker et al. ...................... 423/447.2

* cited by examiner

Primary Examiner—Stephen Kalafut
Assistant Examiner—M. Wills
(74) Attorney, Agent, or Firm—Margaret A. Dobrowitsky

(57) ABSTRACT

A novel high energy density electrode for rechargeable lithium batteries, and process of making same has been developed. The process forms a composite which (1) comprises submicron particles of lithium-alloying sp elements embedded in a conductive matrix of carbon, graphite or a lithium-containing, ionically-conductive glass, and (2) is capable of reversibly accepting and donating lithium. The particles are produced within the conductive matrix through the reaction of halides (e.g., Cl) of the sp elements with Si, B, S or P, which forms volatile halides (e.g., $SiCl_x$, $SCl_x$, $BCl_x$ and $PCl_x$) and submicron size (i.e., less than 0.1 micron, and preferably nanometer size) sp element particles distributed throughout the matrix. By sp element is meant an element whose valence electrons reside in the s and p orbitals of the atoms and are found in the third, fourth and fifth rows of the group III, IV and V elements of the periodic table. Hence elements such as Pb, Sn, Sb, Bi, Al, Ga, Ge, In and Ti are seen to be useful with this invention. Carbon/graphite is the preferred conductive matrix because it has a capability of retaining some reversible lithium itself. Lithium ion-conducting glasses are also useful. Electrochemical studies of the composite anodes in Li cells indicate superior energy capacity over carbonaceous anodes currently used in commercial batteries, (e.g., $LiC_6$). Anodes made according to this invention will contain about 10% to about 80%, by weight, of the submicron elemental material, and the balance conductive matrix, binder materials (e.g., Ca 6%–8% PVDF or EPDM), and some (e.g., about 1% to 12%) conductive dilutents (e.g., carbon particles). The anodes will preferably contain about 10% to about 20% of the submicron elemental material for achieving prolonged cycle life.

11 Claims, 8 Drawing Sheets

HIGH ENERGY GLASS CONTAINING CARBON ELECTRODE FOR LITHIUM BATTERY

CROSS-REFERENCE TO RELATED CASES

This application relies upon provisional application serial number 60/087,149, filed May 29, 1998, which is hereby incorporated by reference.

BACKGROUND OF THE INVENTION

The present application pertains to rechargeable lithium ion batteries and in particular, carbonaceous composite anode materials or conductive lithium ion glass anodes.

Lithium batteries are seen by many to be a most attractive energy storage device. Advanced lithium-ion batteries have been targeted for various applications such as portable electronics, cellular phones, power tools, electric vehicles, and load leveling/peak shaving and are currently replacing many other traditional power sources such as lead-acid batteries. Ni—Cd and Ni-MH batteries. Some rechargeable lithium batteries use lithium-intercalateable carbon or graphitic anodes, and have an energy density of about 372 mAh/g (i.e., for $LiC_6$ anodes). Others use metallic lithium which provide much higher energy density, but also undesirably react with the electrolyte. Lithium alloys having relatively large particle sizes (i.e., >ca. 2 micron) have been used before as the anode of lithium batteries, but have resulted in degradation (e.g., cracking) of the electrode during cycling.

SUMMARY OF THE INVENTION

Described is an electrode such as an anode for use in a lithium ion battery comprising an intercalateable composite carbonaceous composition with a lithium ion conductive glass containing particle size metal or alloy less than about one micron wherein the metal is the reaction product of a metallic halide heated to decomposition temperature preferably in presence of sp elements (i.e. B, P. Si) wherein the metal or alloys have valence electrons in the sp orbital and the electrode reversibly accepts and releases lithium ions.

Also described is a process for producing an electrode for use in a lithium ion battery comprising:

heating, in the presence of a carbonaceous composition, to a decomposition temperature a metallic halide preferably in presence of "sp" elements wherein the metal or alloys have a valence electron in the sp orbital and producing particles of the metal or alloys wherein the particle size is less than about one micron wherein the electrode reversibly accepts and releases lithium ions.

This invention further describes the tailoring of metal or alloy particle sizes and concentrations in the composite anode.

The invention is further directed towards a method of discharging a battery comprising:

providing a cathode and an electrolyte and an anode as described above, and closing the circuit between the anode and the cathode, thereby discharging the battery.

The invention also pertains to a rechargeable lithium ion battery comprising a cathode, an electrode and an anode as described above.

DESCRIPTION OF THE PREFERRED EMBODIMENTS

Figure 1:
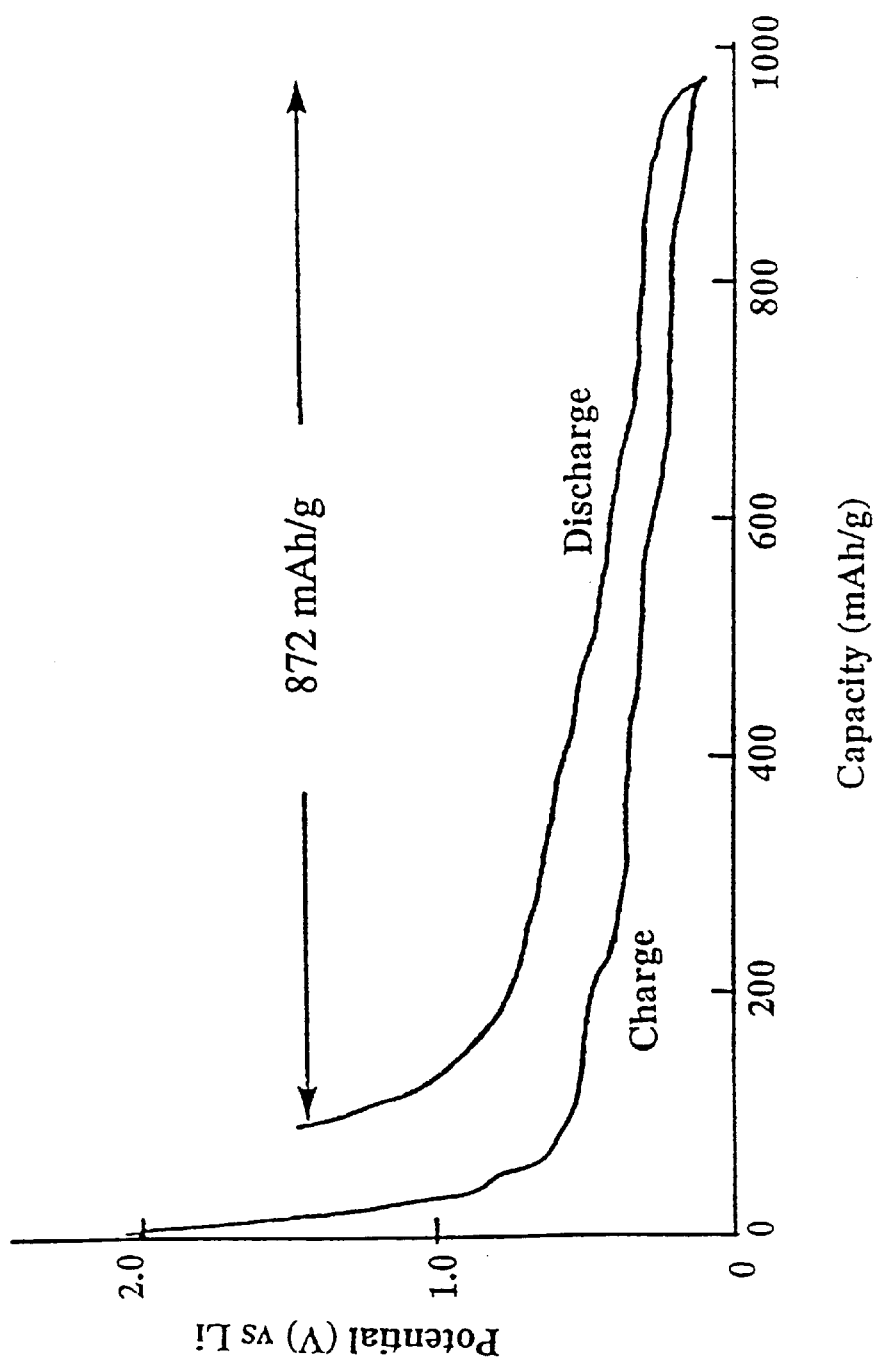
FIG. 1 Voltage profile and capacity of composite anode containing Pb and Si particles in a graphite matrix. The X-axis axis is normalized for mAh/g.

Rechargeable lithium batteries are discussed in the Handbook of Batteries, edited by David Linden, $2^{nd}$ Ed., published by McGraw-Hill, 1995 at page 26.9 and following. The terminology "intercalation" means an insertion of material into a suitable material. In other words, a guest species such as lithium can be inserted into the host latice composite during discharge or charge and subsequently extracted during recharge or discharge with little or no structural modification of the host. The intercalation process involves three principal steps:

(1) Diffusion or migration of solvated lithium ions;

(2) Disolvation and injection of lithium ions into the vacancy structure; and (3) Diffusion of lithium ions into the host structure.

Results of Development

1. A novel process has been developed to form an anode for a rechargeable lithium battery wherein submicron size lithium-alloying elements are formed from halides of the element in situ within a conductive matrix.

2. The composite anode developed has energy densities superior to current commercial carbonaceous anodes.

3. The process developed permits tailoring the energy density and rate capability of the composite anode by varying the composition, concentration and particle size of the lithium-alloying elements and reactants used to form them.

Significance of Development

High-energy density lithium batteries are seen by many to be the only power source capable to meeting the long term requirements of electric vehicles in terms of range per charge. This work provides a high energy density rechargeable anode for a lithium battery. In addition, using this technology the energy and rate capability of the lithium battery can be tailored. A process has been developed to incorporate high capacity submicron sp element particles in a conductive matrix (e.g., carbon, graphite, or lithium-containing conductive glass), capable of reversible insertion/extraction of Li. The energy density and rate capability of the engineered electrode are superior to those commercially available in the market.

Process of Making High Energy Density Anode:

A process has been developed to produce subniron size sp elements in situ within a conductive matrix (preferably Li-intercalateable carbon/graphite). Preparation of the preferred composite anodes involves reaction of sp metal halides with Si (silicon), S (sulfur), B ( boron) or P (phosphorus) powders within a mass of conductive carbonaceous materials. The halides of Si, B, S and P formed by the reaction escape the reaction zone as gases which drives the reaction to completion and leaves no halide residue in the composite. This process incorporates both metallic and/or nonmetallic elements and alloys into the conductive matrix to form a composite which allows alkali metals, such as lithium, to be reversibly inserted and extracted from the composite. Using this process, it is possible to control the size, concentration and composition of the sp elements, and any Si or B residue that may be desired, within the matrix, and hence tailor the energy density and rate capability of the electrode. In this regard, when Si or B residue that may be desired, within the matrix, and hence tailor the energy density and rate capability of the electrode. In this regard, when Si or B are used to react with the halide, excess B or Si can be used so that some B or Si remains as a residue in the composite for alloying with Li to form $Li_4Si$, or $Li_3B$ from which the lithium can be extracted during cycling of the battery. On the other hand, when P or S are used to react with the sp element halides, they should be used in stoichiometric quantities with the halide so as to consume all of the halide but not leave any S or P residue which has no Li-retaining capability. Composites produced according to this process provide higher gravimetric and volumetric energy densities than purely carbonaceous graphitic electrodes heretofore known.

The preferred process involves reaction of chlorides of sp element with silicon powder. Silicon and sp element chloride particles are premixed with conductive matrix materials, and heated in an inert atmosphere at temperatures close to the melting point of the sp element chloride. At about the melting temperature of the sp element chloride, silicon powder reacts with the sp element chloride to produce gaseous species, $SiCl_x$, and submicron particles of the sp element. Higher temperatures, which sublime the metal halides, should be avoided. Elemental chlorides include chlorides of elements from the third, fourth, and fifth row of the group III, IV, V or VI of the periodic table, e.g., Pb, Sn, Sb, Bi, Al, Ga, Ge, In and Ti or mixtures thereof. A typical reaction scheme for preparation of the composite from the meal halide and silicon can be shown as

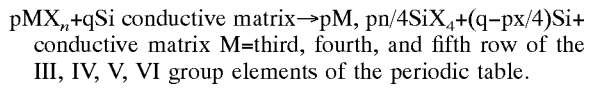

conductive matrix M=third, fourth, and fifth row of the III, IV, V, VI group elements of the periodic table.

X=a halogen, as chlorine, bromine, fluorine and iodine, preferably Cl.

The reaction rate is driven toward completion as the SiX4 escapes from the reaction zone. By adjusting the ratio of the sp element halides to silicon or boron concentrations and particle sizes of the starting reactants, the quantity and final size of the excess silicon or boron and sp element can be controlled to optimize the battery electrode performance. In this regard, the reaction between the halide and silicon or boron particles occurs on their respective surfaces and works inwardly toward the centers of the particles. Hence the size of the respective particles decreases as the reaction progresses, leaving a residue of small silicon or boron particles from a reaction initiated with larger such particles. Similarly, the halide particles shrink as they release the halogen, leaving small elemental particles in their place.

The conductive matrix will preferably comprise lithium-intercalateable carbon or graphite which also serves to reversibly retain some lithium. Moreover, it has been observed that the Si chloride formed during the reaction etches the surface of the carbon/graphite so as to remove any lithium trapping active sites thereon which substantially improves the effectiveness of the carbon/graphite. In this regard, removal of such sites reduces the amount of lithium that might otherwise be trapped irreversibly within the carbon/graphite.

The conductive matrix may alternatively comprise lithium-containing, lithium ion conductive glasses such as are used as electrolytes in solid state lithium batteries. Such glasses are typically formed by mixing $Li_2O$ (e.g., 10–20 molar %) with 80–90 molar % of a 50-50 mixture of $SiO_2$ and $LiPO_3$ (or $LiPO_4$) and cooking the mix in an $O_2$-rich atmosphere at greater than about 700° C. for about 8 hours. The thusly formed glass is then ground to the desired size (i.e., less than 1 micron) for forming the composite anode of the present invention. $LiBO_2$ may be substituted for some or all of the phosphate in the glass formulation.

The decomposition temperature for the metal halides can range broadly from 50° C. to 2400° C. The temperature of the metal and the metal halides can vary significantly as shown from the table recited below.

TABLE

|  | Melting Point | Boiling Point |
|---|---|---|
| Lead Chloride | 498° C. | 950° C. |
| Stannous Chloride | 246° C. | 652° C. |
| Silicon Chloride |  | 57° C. |
| Bismuth Chloride | 227° C. | 300° C. |
| Sulfur Chloride |  | 138° C. |
| Silicon | 1410° C. | 2355° C. |
| Silicon Tetra Bromide |  | 153° C. |

Listed below are the preferred embodiments wherein all temperatures are in degrees Centigrade and all parts are parts by weight unless otherwise indicated.

EXAMPLE 1

A composite electrode containing lead and silicon particles was prepared by grinding a mixture having a ratio of 0.1M $PbCl_2$ and 0.1M Si into a matrix of graphite. The graphite comprised 15% by weight of the total mixture. The grinding was performed as a slurry in the micronizer using cyclohexane as the slurry medium. The ground mixture was poured onto a flat ceramic boat, and the cyclohexane was removed in an argon antechamber of a dry box at 90° C. under $10^3$ tor. The dry powder was then placed in a tube furnace and heated at 550° C. under flowing Argon for 3 hours. The product was cooled to ambient temperature with the Argon still flowing. This product was used to make electrodes according to the following procedure.

Figure 2:
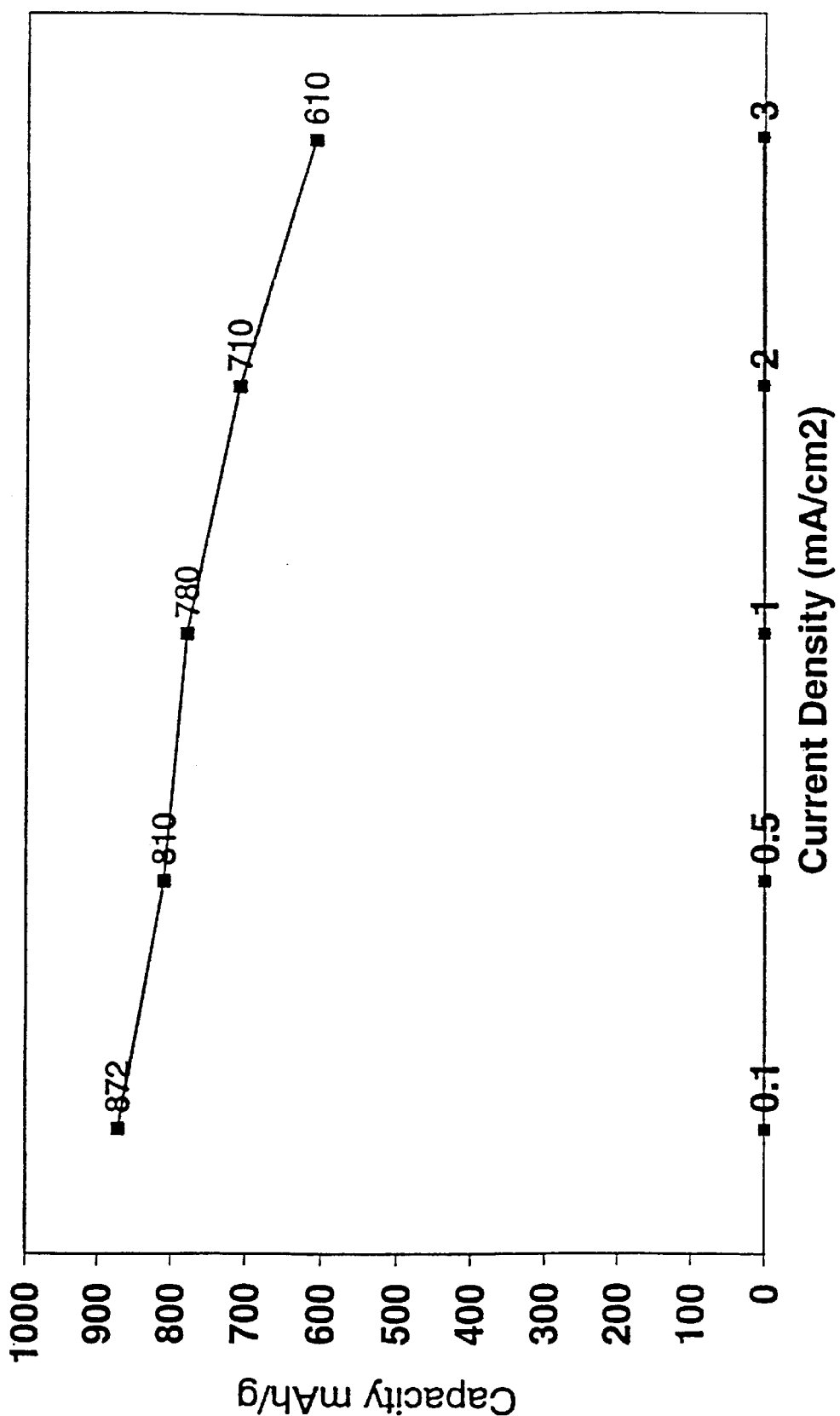
FIG. 2 Rate dependent capacity of composite anode containing Pb, Si in graphite matrix from 0.1 to 3.0 $mA/cm^2$.

The dried active composite material was mixed with a polymeric binder (i.e., about 1%–10% by wt, EPDM (ethylene propylene diene monomer)—preferably 8% by wt), and conducive diluents (about 1%–12% by wt. Shwanigan Black—preferably 10%) in an organic solvent, preferably xylene. This slurry is spread onto a current collector (i.e., Cu foil), and dried. Drying was commenced at ambient temperature and pressure, followed by further drying under vacuum and heat ($10^{-3}$ tor and 110° C.). The amount of active composite material in the electrode was 80%. The resulting electrode was then cut to size (2.5 $cm^2$), and pressed at 2 tons/$cm^2$. The pressed electrode was tested against a metallic lithium electrode in an electrochemical cell containing an electrolyte comprising 0.8M $LiPF_6$ in 2:1 mole ratio with ethylene carbonate-dimethylcarbonate. A constant current (0.1–1.0 mA) was applied to the cell while the cell voltage was monitored, to insert lithium into the composite material. Lithium insertion was imposed at 0.1 mA/$cm^2$. The capacity is mostly due to the lithium insertion within the lead and any silicon residue present, which forms various lithium-lead and lithium-silicon alloys and the graphite matrix. The lithium extraction capacity of the electrode was 872 mAh/g at 0.1 mA/cm². The capacity of the electrode was lower at higher current densities. FIG. 2 shows the rate dependent capacities of the electrode at various current densities from 0.1 to 3 mA/cm². The electrode capacity at 3 mAh/g was 610 mAh/g. The capacity of the electrode was dependent on the concentration of Pb and Si in the composite electrode and is much higher than that of purely carbonaceous anodes.

Figure 3:
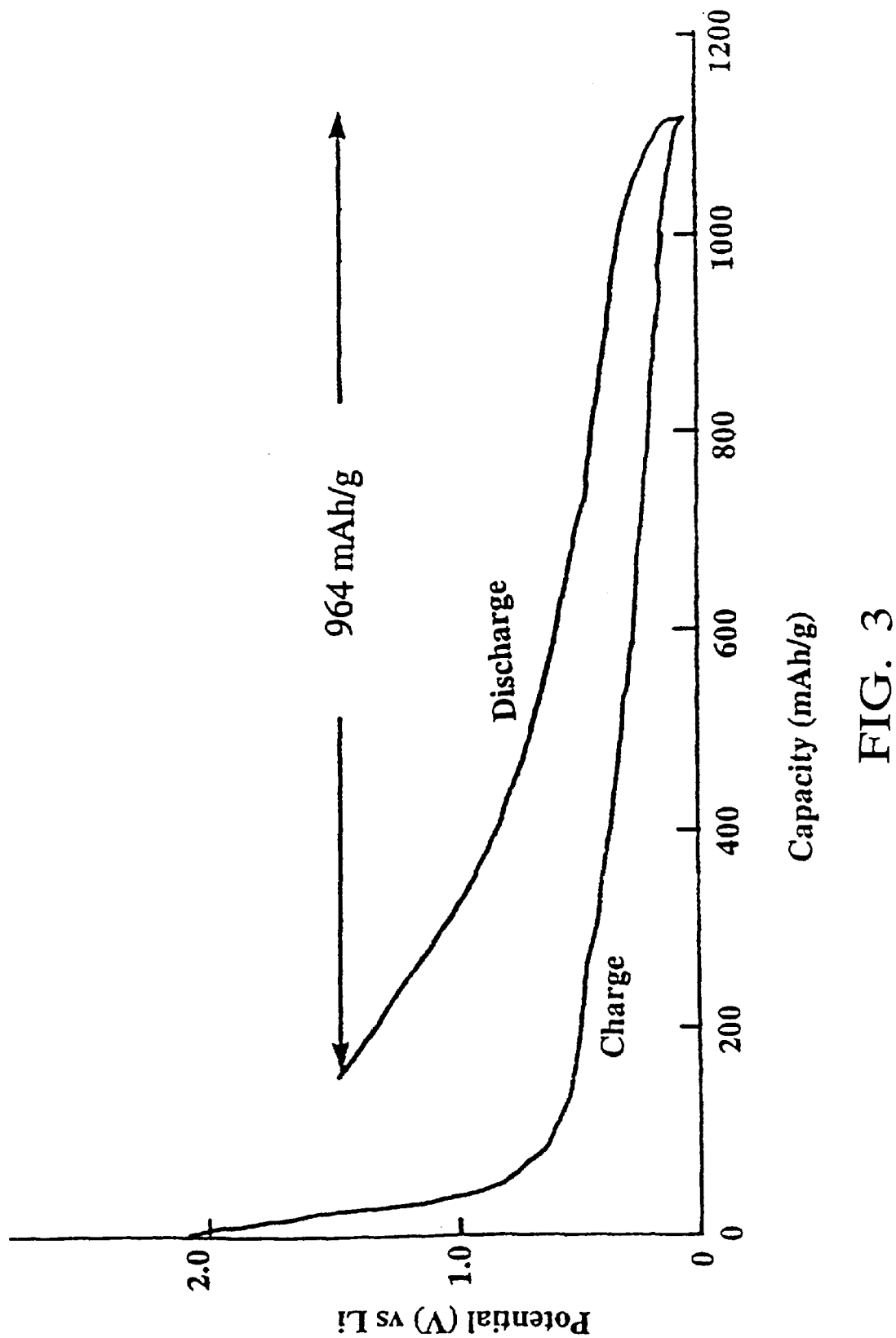
FIG. 3 Capacity of composite anode containing Pb, Si in graphite matrix.

FIG. 3 shows the capacity of a composite electrode prepared from an initial mix of 0.1M PbCl₂ and 0.15 Si in a 15% by wt graphite fiber matrix. The electrode can be engineered to match a desired value needed to balance the capacity of the cathode by adjusting the concentration and particle size of the Pb and Si in the composite. The charge transfer on a composite anode and formation of Li ally is given as

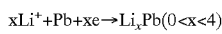

$xLi^+ + Pb + xe \rightarrow Li_xPb (0 < x < 4)$

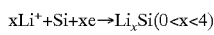

$xLi^+ + Si + xe \rightarrow Li_xSi (0 < x < 4)$

In addition, it appears that the process developed in this work has modified the irreversible capacity of the carbonaceous matrix as well. In this regard, the electrolyte decomposition plateau is around 0.8 volt which is much smaller than those tested for untreated graphite. Electron micrographs of the carbon fibers in the matrix indicates that this improved performance is mainly due to selective etching of the defective carbons by volatile $SiCl_x$ and possible generation of chlorine gases.

Figure 4:
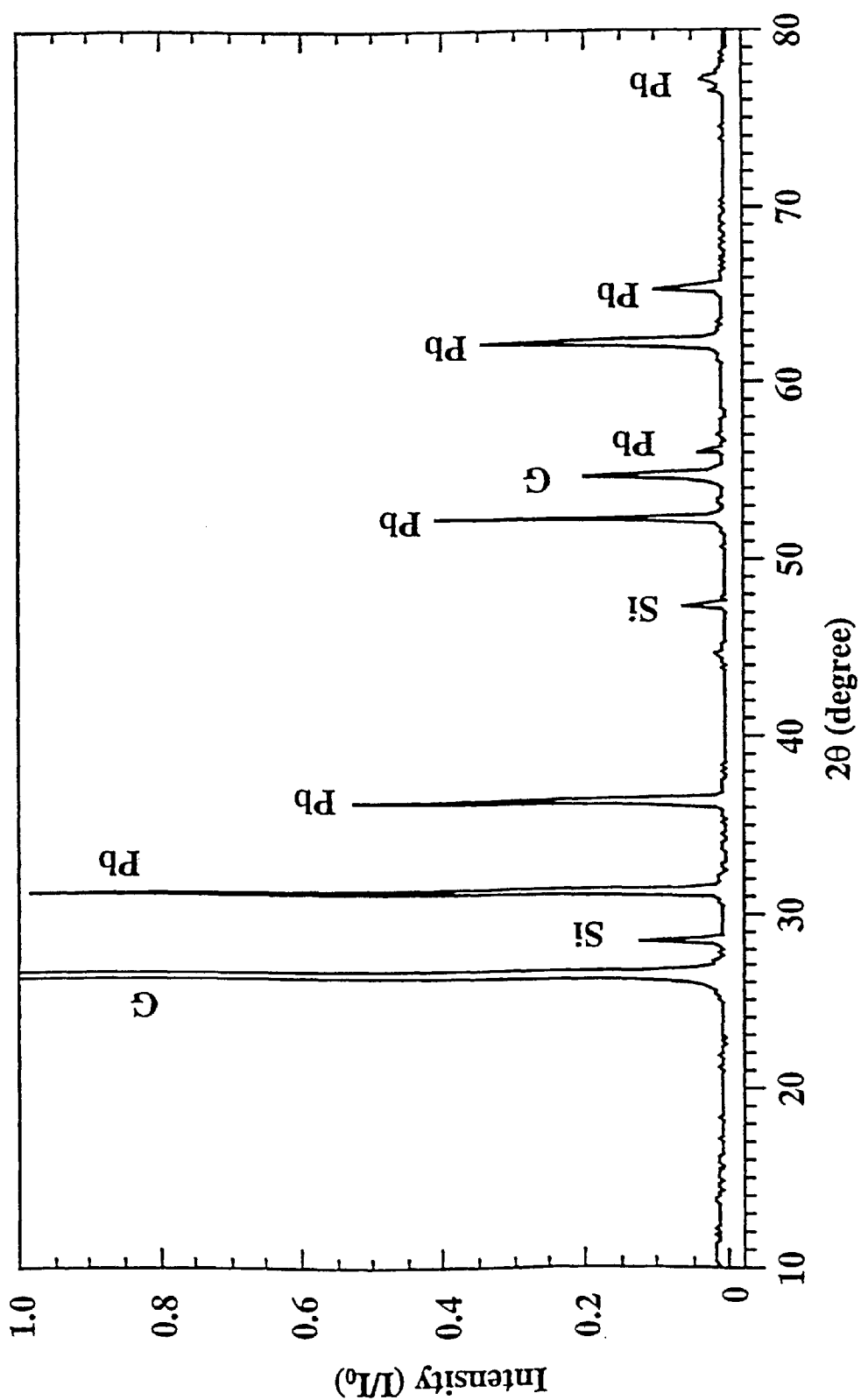
FIG. 4 X-ray diffraction of composite anode containing lead and Si in graphite matrix.
Figure 5:
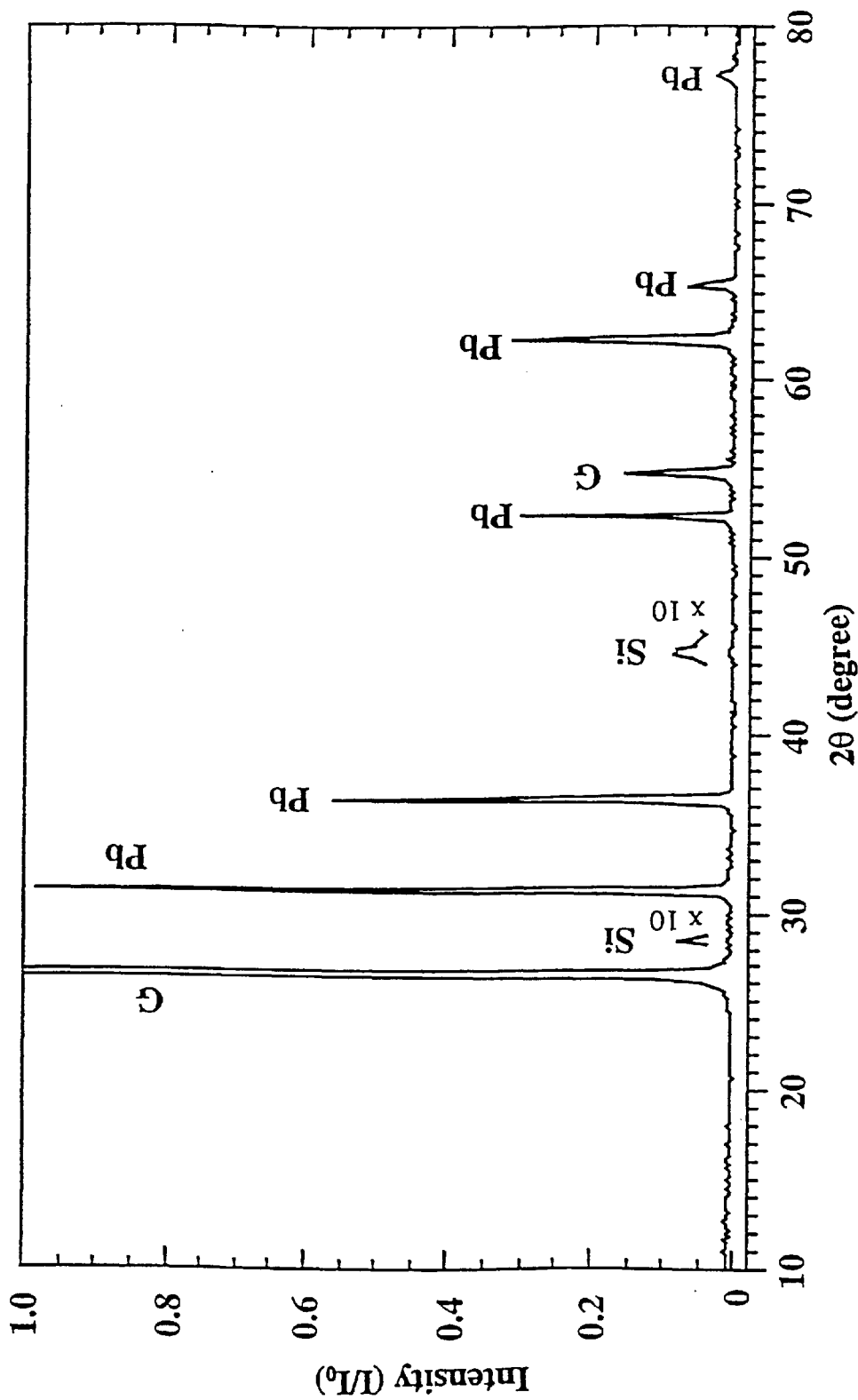
FIG. 5 X-ray diffraction of composite anode containing Pb.

FIG. 4 shows the x-ray diffraction of the products formed by heating (i.e., to about the melting point of PbCl₂) an unstoichiometric mixture (i.e., excess Si) of lead chloride and Si powder within a graphite fiber matrix. The data shows the presence of diffraction lines reacted to metallic lead and the remaining silicon. On the other hand, the reaction of Si with lead chloride is stoichiometric, when a mixture of 0.2 PbCl₂ and 0.1M Si is mixed in a graphite matrix and heated. X-ray diffraction of the product produced by such a stoichiometric reaction shows only diffraction lines of graphite and metallic Pb (FIG. 5). Hence, the amount of Si and Pb can be adjusted during preparation of the initial precursors to achieve a desired Pb and Si mix in the end product. Finally, x-ray diffraction lines of the remaining Si particles are much broader than the Si powder used as the precursor, indicating that significant reduction in Si particle size occurred during reaction with PbCl₂. Using this process, the size of the silicon particles can be reduced to much smaller sizes which are more useful for battery applications. Excess heat treatment of the composite may sinter the generated metals to produce larger particle sizes.

EXAMPLE 2

Figure 6:
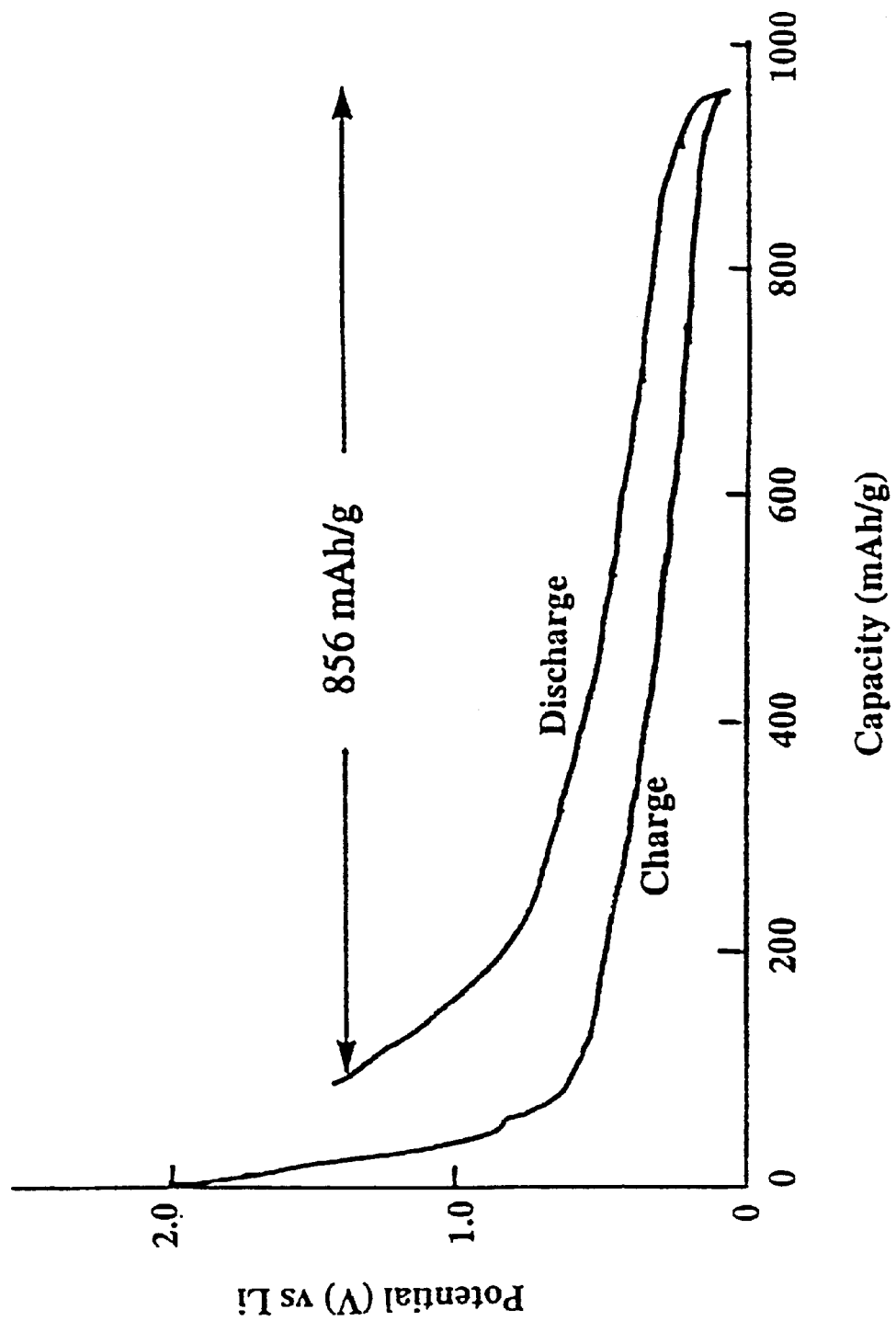
FIG. 6 Voltage profile and capacity of the composite anode containing Sn an d Si.

A procedure similar to that set forth in Example 1 was used, but with tin chloride (instead of lead chloride) to prepare a composite anode containing tin and Si in a graphite matrix. 0.1M SnCl₂ and 0.1M Si was mixed with graphite matrix, and an electrode having 80% active composite material (sn/Si) was prepared for electrochemical testing. FIG. 6 shows charge-discharge cycling of the tin-silicon-graphite electrode. The capacity of the electrode is mainly due to the insertion/extraction of lithium into and out of the tin and residual silicon particles, which forms various phases of Li—Sn, and Li—Si alloys during the lithium insertion process. The initial lithium extraction capacity of this composite electrode was 856 mAh/g.

EXAMPLE 3

Figure 7:
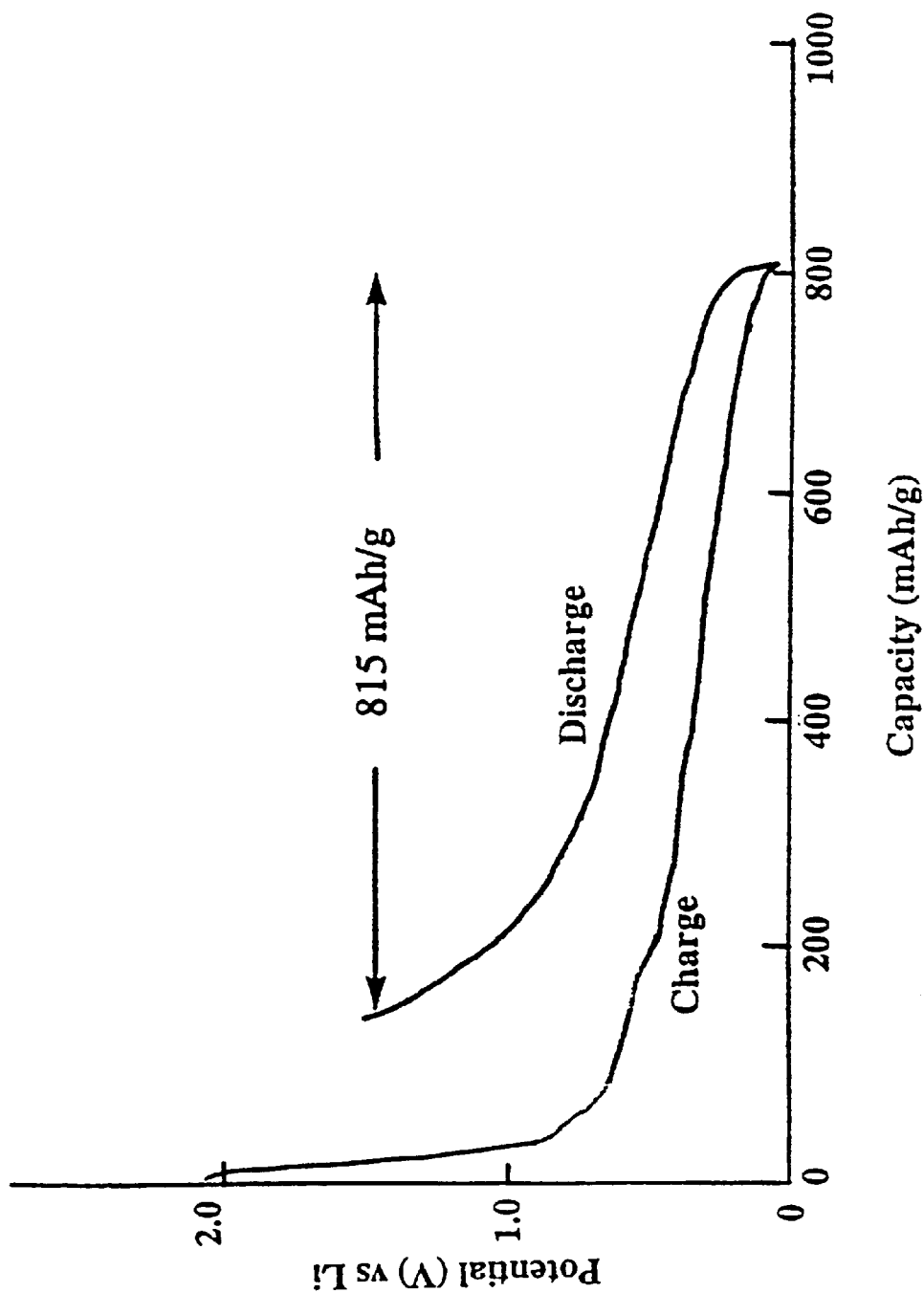
FIG. 7 Voltage profile of composite anode containing Sb and Si in graphite matrix.

A procedure similar to that set forth in Example 1 was used but with antimony chloride (instead of lead chloride) and Si mixture in a grahitic matrix. The composite electrode was prepared from a mixture of 0.1M SbCl₂ and 0.1M Si in a 15% graphite matrix. The electrode preparation was similar to Example 1 and the electrode contained 80% active composite material. FIG. 7 shows the charge-discharge capacity of the composite anode, and, compared with that of a pure graphitic electrode, shows extra capacity due to formation of Sb—Li and Si—Li alloys during the lithium insertion/extraction process. The reversible capacity for this electrode was 815 mAh/g.

EXAMPLE 4

Figure 8:
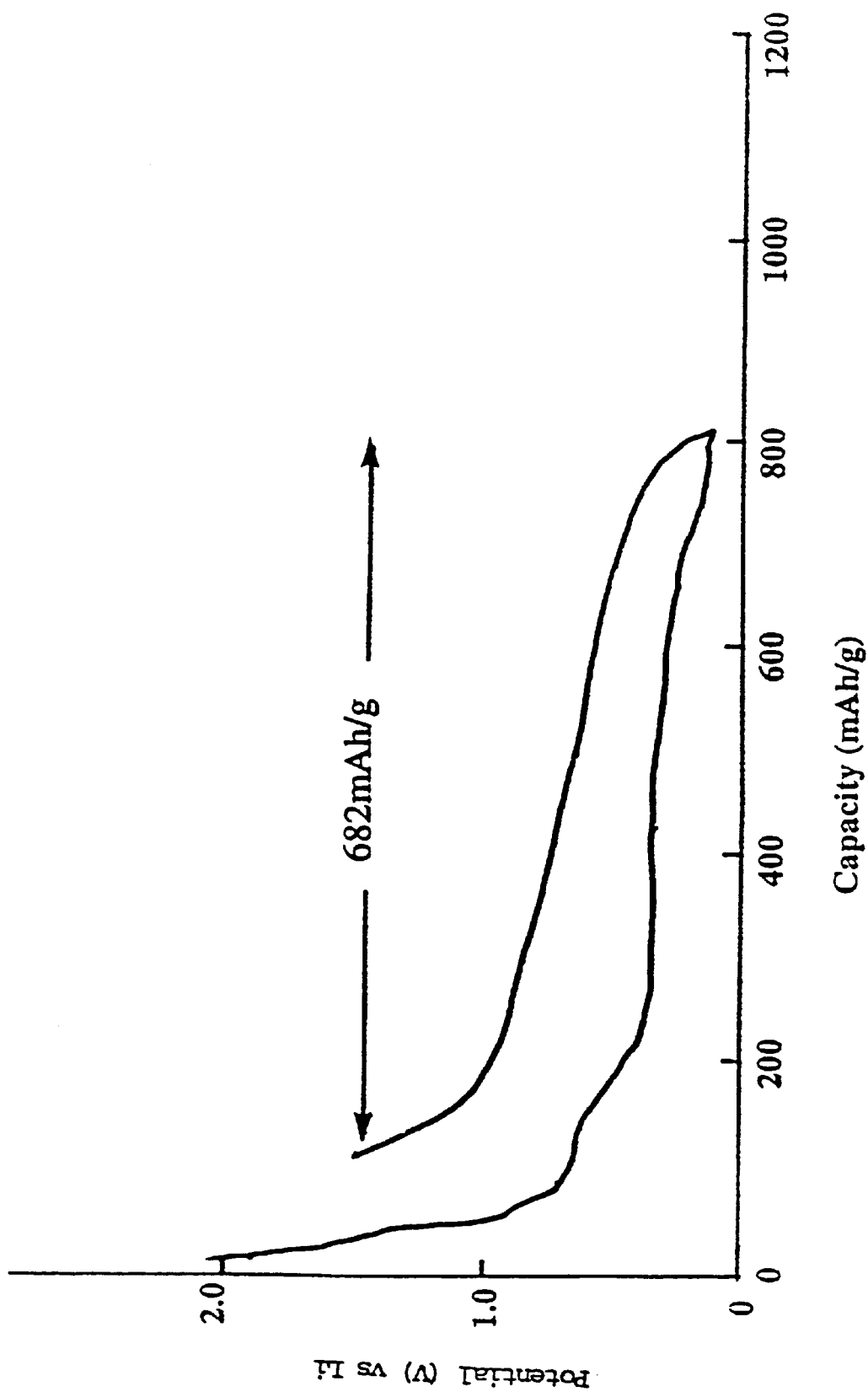
FIG. 8 Voltage profile and capacity of composite anode containing Bi, Si in graphite matrix.

A process similar to that set forth in Example 1 was used, but with bismuth chloride and silicon mixture with graphite. 0.1M BhiCl₃ and 0.15M Si were mixed with 15% graphite and used as a precursor to prepare a BiSi-graphite composite anode. The electrode preparation was the same as in Example 1. FIG. 8 shows the charge-discharge capacity of the composite anode and, compared with the capacity of the pure graphitic electrode, indicates extra capacity due to the formation of Bi—Li and Si—Li alloys during the lithium insertion process. The reversible capacity of this composite electrode for lithium extraction was 682 mAh/g.

Other elements such as B, P and S form volatile and reactive halides will perform in essentially the same manner as silicon, though silicon is preferred for the reasons set forth above. Likewise, use of halides other than chlorides are also seen to be effective so long as the halide reacts with the Si, B, P and S to form a volatile compound that escapes from the reaction zone.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. An electrode for use in a lithium ion battery comprising an intercalatable carbonaceous composition with a lithium ion conductive glass containing particle size metal less than about one micron wherein the metal is the reaction product of a metallic halide heated to decomposition temperature wherein the metal has a valence electron in the sp orbital and the electrode reversibly accepts and releases lithium.

2. The electrode of claim 1 wherein the metal halide is heated in the presence of sp elements boron (B), phosphorus (P), silicon (Si) or sulfur(S).

3. The electrode of claim 1 which is comprised of a composite carbonaceous composition.

4. The electrode of claim 1 wherein the metal is selected from the group consisting of Pb, Sn, Sb, Bi, Al, Ga, Ge, In and Ti.

5. A process for producing an electrode for use in a lithium ion battery comprising:

heating, in the presence of a carbonaceous composition, to a decomposition temperature a metallic halide wherein the metal has a valence electron in the sp orbital and producing particles of the metal wherein the particle size is less than about one micron and the electrode reversibly accepts and releases lithium ions.

6. The process of claim 5 wherein the metal halide is heated in the presence of sp elements boron (B), phosphorus (P), silicon (Si) or sulfur (S).

7. The process of claim 5 wherein the metal is selected from the group consisting of Pb, Sn, Sb, Bi, Al, Ga, Ge, In and Ti.

8. The process of claim 5 wherein the temperature ranges from 50° C.–2400° C.

9. A method of discharging a battery comprising:

providing a cathode and an electrolyte and the electrode of claim 1 as an anode, and closing the circuit between the anode and the cathode, thereby discharging the battery.

10. A rechargeable lithium ion battery comprising a cathode and an electrolyte and the electrode of claim 1 as an anode.

11. The battery of claim 10, wherein the metal halide is heated in the presence of sp elements boron (B), phosphorus (P), silicon (Si) or sulfur.

* * * * *